(12) United States Patent
Johnson

(10) Patent No.: US 7,521,632 B2
(45) Date of Patent: Apr. 21, 2009

(54) DOOR HINGE ASSEMBLY AND ENCLOSURE EMPLOYING THE SAME

(75) Inventor: Jeffrey L. Johnson, Lincoln, IL (US)

(73) Assignee: Gaton Corporation, Cleveland, OH (US)

( * ) Notice: Subject to any disclaimer, the term of this patent is extended or adjusted under 35 U.S.C. 154(b) by 288 days.

(21) Appl. No.: 11/468,973

(22) Filed: Aug. 31, 2006

(65) Prior Publication Data

US 2008/0053677 A1    Mar. 6, 2008

(51) Int. Cl.
*H02G 3/14* (2006.01)

(52) U.S. Cl. .............................. 174/67; 174/66; 174/58; 174/135; 439/136; 220/241

(58) Field of Classification Search ................... 174/50, 174/58, 63, 64, 135, 66, 67; 361/679, 622; 439/535, 135, 136, 147; 248/906; 220/4.02, 220/241, 242

See application file for complete search history.

(56) References Cited

U.S. PATENT DOCUMENTS

| 5,557,828 A | 9/1996 | Reiner et al. |
| 6,081,968 A | 7/2000 | Walker et al. |
| 7,049,516 B1 | 5/2006 | Haag et al. |

*Primary Examiner*—Dhiru R Patel
(74) *Attorney, Agent, or Firm*—Martin J. Moran

(57) ABSTRACT

A door hinge assembly is provided for an enclosure including a housing having a panel member, and a plurality of sides extending outwardly from the panel member to define an interior and an opening for providing access to the interior. The door hinge assembly includes a generally planar portion covering the opening of the housing of the enclosure, at least one side flange portion extending outwardly from the generally planar portion toward the housing of the enclosure and including a number of bends forming at least one first hinge element, and at least one second hinge element disposed at or about one of the sides of the housing to pivotably receive a corresponding first hinge element. The side flange portion, including the first hinge element thereof, is a single continuous piece of material. The door hinge assembly is movable between an open position and a closed position.

22 Claims, 5 Drawing Sheets

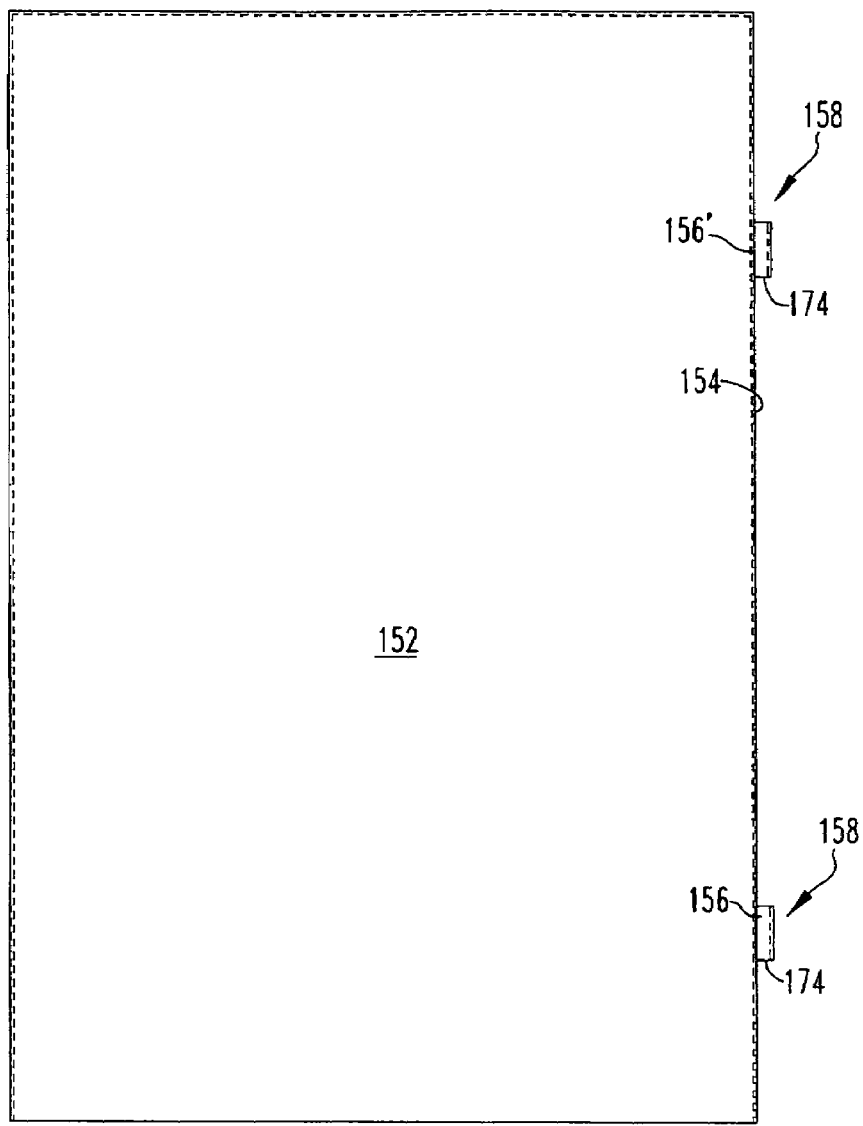
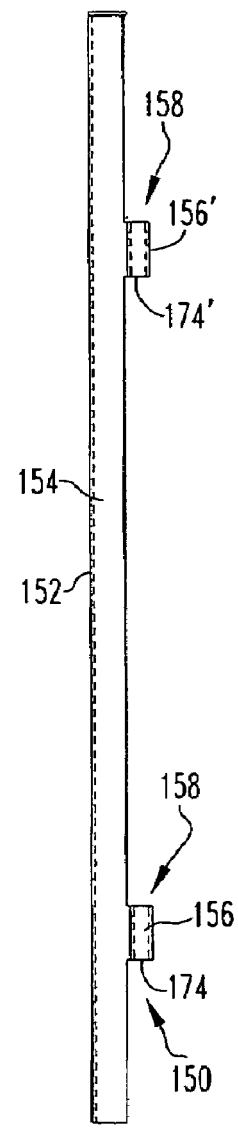
FIG.3A
FIG.3B
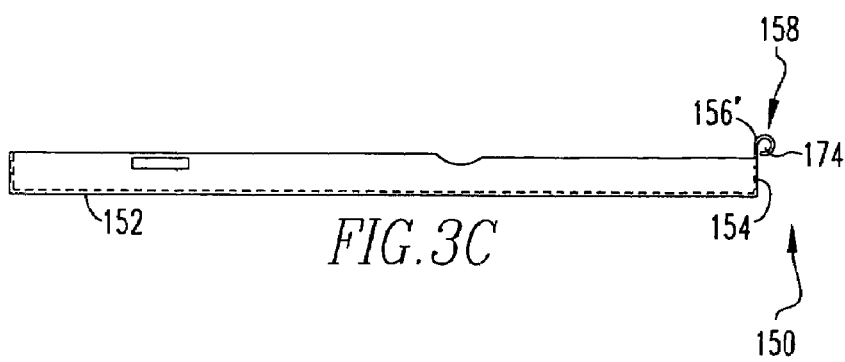
FIG.3C

DOOR HINGE ASSEMBLY AND ENCLOSURE EMPLOYING THE SAME

BACKGROUND OF THE INVENTION

1. Field of the Invention

The invention relates generally to enclosures and, more particularly, to door hinge assemblies for electrical enclosures. The invention also relates to electrical enclosures employing door hinge assemblies.

2. Background Information

Electrical equipment such as, for example, relays, circuit breakers, electric meters and transformers, are typically housed within an enclosure such as, for example, a housing, such as a box or cabinet, to protect the electrical equipment. When such electrical equipment is disposed outdoors, it must be protected from the environment, for example, to prevent electrical faults caused by moisture. Accordingly, outdoor electrical enclosures are provided with a variety of moisture-resistant devices such as hoods and/or overlapping covers, and adjustable doors.

FIG. 1 shows an example of one such enclosure. Specifically, an outdoor electrical enclosure 2 is shown which generally comprises a housing 4 having opposing sides 6,8, a back panel 10 extending between the sides 6,8, a bottom 12, a hood 14, and a door 16. The door 16 is coupled to side 6 of the housing 4 by way of a pair of telescopic hinge assemblies 18. The telescopic hinge assemblies 18 are structured to permit the door 16 to be adjusted in the vertical direction for providing a proper moisture-resistant fit with respect to the hood 14, such that the hood 14 partially covers or overlays the top of the door 16 when the door 16 is closed. Telescopic hinges are discussed, for example, in U.S. Pat. No. 6,879,483 issued on Apr. 12, 2005 to Johnson et al., entitled "Outdoor Electrical Enclosure and Hood Therefor." Each telescopic hinge assembly 18 includes a hinge pin 20, which is coupled to the side 6 of the enclosure housing 4, and a corresponding hinge bracket 22. The hinge brackets 22 are separate components which are suitably fastened to the side flange 24 of the door 16, typically by welding (e.g., spot welding). Each hinge bracket 22 includes a curled tubular portion 26 structured to pivotably receive a corresponding one of the hinge pins 20, and a flange 28 which is welded to the door side flange 24. Similar multi-component hinge assemblies (not shown) are employed for pivotable doors (not shown) which are not required to be telescopic in nature, with the primary difference of such doors being only that the pins (not shown) are not structured to provide vertical movement of the door 16.

Such multi-component hinge assemblies (e.g., 18) suffer from a number of unique disadvantages which are, in large part, related to the nature of their construction. Specifically, properly aligning the separate hinge brackets 22, which are welded to the side flange 24 of the door 16, requires the use of locating protrusions or nibs 30 on the flange 28 which are received in corresponding locating holes (not shown) on the side flange 24. This structure and associated assembly process is cost-intensive and time-consuming. Additionally, the weld process is subject to human error, and can lend to problems having a negative impact on part quality and accuracy. For example, the weld area can be easily contaminated, compromising the integrity of the weld, and weld spatter can enter the curled tubular portions 26 of the hinge brackets 22 thus inhibiting its interaction with the hinge pins 20. Additionally, despite the aforementioned locating nibs 30 and holes (not shown), slight errors in alignment can occur and impede proper function of the hinge assembly 18 and door 16.

Another problem with known electrical enclosures is that the door can come open when it is desired that the door remain closed. For example, in outdoor applications, it is desirable to consistently maintain the door in a closed position in order to avoid the undesired entry of moisture and/or debris. Wind can undesirably open the door and, in some mounting configurations, for example, where the surface or structure to which the enclosure is mounted is not straight and level, the uneven mounting arrangement of the enclosure can cause the door to undesirably open.

Accordingly, there is room for improvement in electrical enclosures, and in door hinge assemblies therefor.

SUMMARY OF THE INVENTION

These needs and others are met by embodiments of the invention, which provide door hinge assemblies for electrical enclosures, such as, for example panel boards.

As one aspect of the invention, a door hinge assembly is provided for an enclosure. The enclosure includes a housing having a panel member and a plurality of sides extending outwardly from the panel member to define an interior and an opening for providing access to the interior. The door hinge assembly comprises: a generally planar portion structured to cover the opening of the housing of the enclosure; at least one side flange portion structured to extend outwardly from the generally planar portion toward the housing of the enclosure, such side flange portion including a number of bends forming at least one first hinge element; and at least one second hinge element structured to be disposed at or about one of the sides of the housing of the enclosure, in order to pivotably receive a corresponding one of the at least one first hinge element, wherein such flange portion, including the first hinge element thereof, is a single continuous piece of material, and wherein the door hinge assembly is structured to move between an open position corresponding to the interior of the housing of the enclosure being accessible through the opening of the housing, and a closed position in which the generally planar portion of the door hinge assembly substantially covers the opening of the housing.

The second hinge element may include at least one biasing mechanism structured to bias the door hinge assembly in order to maintain the door hinge assembly in the closed position. The second hinge element may comprise a hinge pin structured to be coupled to one of the sides of the housing, and the biasing mechanism may comprise at least one spring including a first end, a second end, and a plurality of coils disposed between the first end and the second end. The hinge pin may engage the coils of the spring, the first end of the spring may engage one of: (a) a portion of the hinge pin, and (b) the side of the housing on which hinge pin is disposed, and the second end of the spring may engage and bias a portion of the door hinge assembly toward the closed position. The spring may be selected from the group consisting of a torsion spring and a compression spring.

The bends of the first hinge element may comprise a pair of bends of the single continuous piece of material of the side flange portion of the generally planar portion, wherein the pair of bends comprises a pair of curled hinge barrels. The second hinge element may comprise a pair of hinge pins structured to be coupled to one of the sides of the housing in order to pivotably receive the curled hinge barrels. The sides of the housing of the enclosure may comprise first and second opposing side walls, a base, and a moisture-resistant hood, and the hinge pins and the hinge barrels pivotably received by the hinge pins may comprise a pair of telescopic hinge assemblies for the door hinge assembly, wherein at least one of the telescopic hinge assemblies further comprises a spring structured to bias the door hinge assembly in the vertical direction, under the moisture-resistant hood. The first hinge element may alternatively comprise a first single elongated hinge curl, and the second hinge element may comprise a second hinge curl cooperable with the first single elongated hinge curl in order to permit the door hinge assembly to pivot with respect to the housing of the enclosure. The second hinge curl and the side of the housing of the enclosure may be one single continuous piece of material.

As another aspect of the invention, an enclosure comprises: a housing including a panel member and a plurality of sides extending outwardly from the panel member to define an interior and an opening for providing access to the interior; and a door hinge assembly comprising: a generally planar portion structured to cover the opening of the housing of the enclosure, at least one side flange portion extending outwardly from the generally planar portion toward the housing, at least one of the at least one side flange portion including a number of bends forming at least one first hinge element, and at least one second hinge element disposed at or about one of the sides of the housing in order to pivotably receive a corresponding one of the at least one first hinge element, wherein the at least one of the at least one side flange portion, including the at least one first hinge element thereof, is a single continuous piece of material, and wherein the door hinge assembly is movable between an open position corresponding to the interior of the housing of the enclosure being accessible through the opening of the housing, and a closed position in which the generally planar portion of the door hinge assembly substantially covers the opening of the housing.

The enclosure may be an electrical enclosure wherein the panel member of the housing of the electrical enclosure comprises a back panel, wherein the sides of the housing of the electrical enclosure comprise first and second opposing sidewalls extending outwardly from the back panel, a base, and a top disposed generally opposite and distal from the base, and wherein the door hinge assembly is pivotably coupled to one of the first and second opposing sidewalls of the housing of the electrical enclosure.

BRIEF DESCRIPTION OF THE DRAWINGS

A full understanding of the invention can be gained from the following description of the preferred embodiments when read in conjunction with the accompanying drawings in which:

FIGS. 3A, 3B and 3C are vertical elevational, side elevational, and bottom plan views, respectively, of the door and hinge thereof, of FIG. 2;

DESCRIPTION OF THE PREFERRED EMBODIMENTS

For purposes of illustration, embodiments of the invention will be described as applied to door hinge assemblies for outdoor electrical enclosures for enclosing electrical equipment (e.g., without limitation, relays; circuit breakers; electric meters; transformers), although it will become apparent that they could also be applied to hinged doors of other types of enclosures adapted for both indoor and outdoor, weather-resistant use.

As employed herein, the term "fastener" refers to any suitable fastening, connecting or tightening mechanism expressly including, but not limited to, screws, rivets, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" means one or an integer greater than one (i.e., a plurality).

Figure 2:
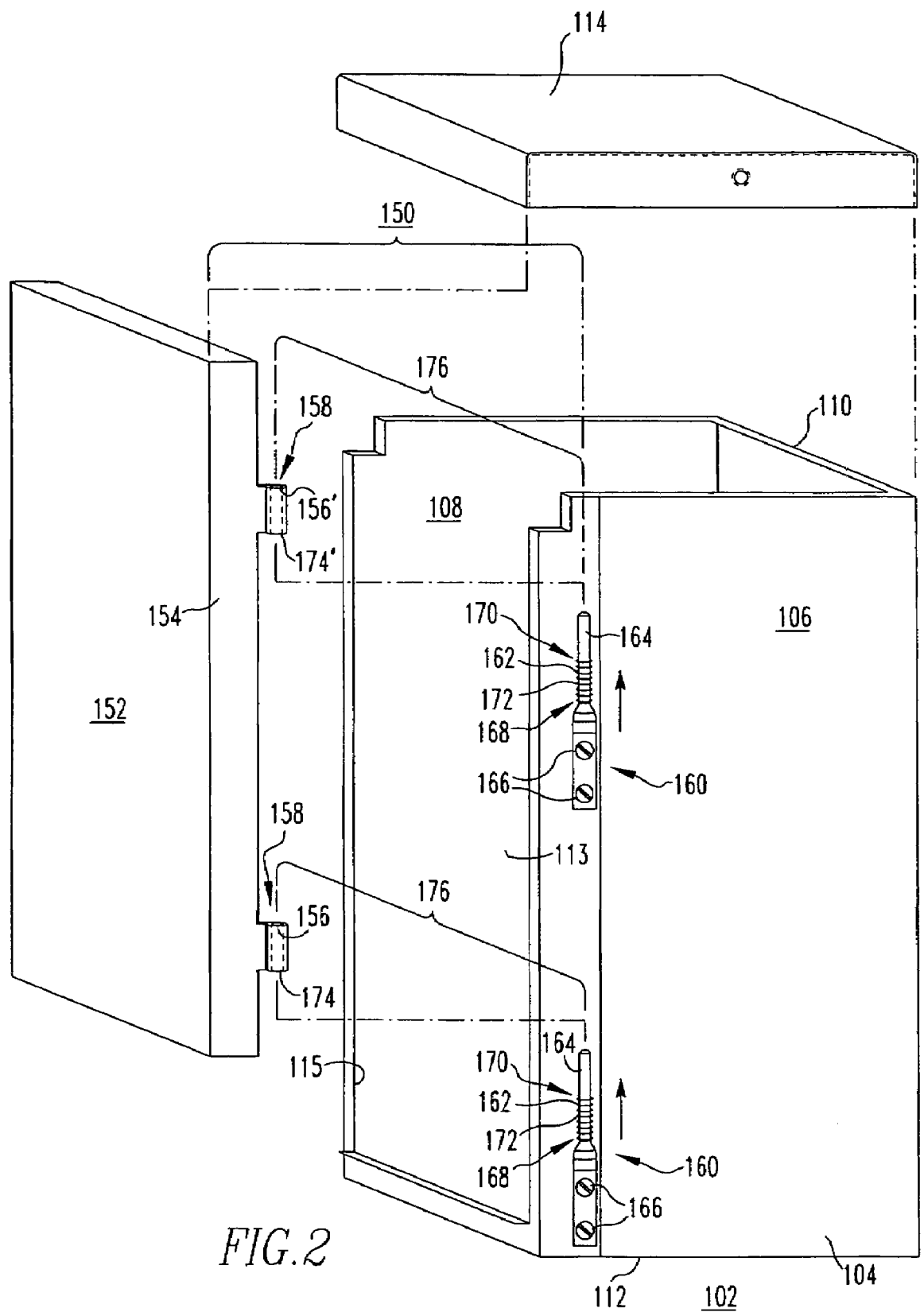
FIG. 2 is an isometric view of an electrical enclosure including a door having telescopic hinge assemblies with biasing mechanisms, in accordance with an embodiment of the invention.

FIG. 2 shows an enclosure, such as an electrical enclosure 102 (e.g., without limitation, a panel board; a load center; a switchgear cabinet), employing a door hinge assembly 150. The electrical enclosure 102 includes a housing 104 having a panel member 110 and a plurality of sides 106,108,112,114 extending outwardly from the panel member 110 to define an interior 113 and an opening 115 for providing access to the interior 113. In the example shown and described herein, the panel member 110 of the housing 104 is a back panel 110, and the sides 106,108,112,114 of the housing 104 include first and second opposing sidewalls 106,108 extending outwardly from the back panel 110, a base 112 at the bottom (from the perspective of FIG. 2) of the housing 104, and a top 114 disposed generally opposite and distal from the base 112. It will be appreciated that the top 114 may comprise any known or suitable top, cover or hood such as, for example and without limitation, the moisture-resistant hood 114, shown (see also moisture-resistant hood 214 shown in FIG. 4).

The door hinge assembly 150 includes a generally planar portion 152 which is structured to cover the opening 115 of the enclosure housing 104. At least one side flange portion 154 extends outwardly from the generally planar portion 152 toward the housing 104 and includes a number of bends 156 which form at least one first hinge element 158. At least one second hinge element 160 is disposed at or about one of the first and second opposing sidewalls 106,108 of the housing 104, in order to pivotably receive a corresponding one of the first hinge element(s) 158. The side flange portion 154 and the first hinge element(s) 158 thereof, comprise a single continuous piece of material. The door hinge assembly 150 is movable between an open position (not shown) corresponding to the interior 113 of the housing 104 of the electrical enclosure 102 being accessible through the opening 115 thereof, and a closed position (see, for example, FIG. 5) in which the generally planar portion 152 of the door hinge assembly 150 substantially covers the opening 115 (see also, opening 315 covered by generally planar portion 352, shown in the closed position in FIG. 5) of the housing 104.

In the example of FIG. 2, one side flange portion 154 of the door hinge assembly 150 includes a pair of first hinge elements 158. Specifically, the side flange portion 154 of the door assembly 150 includes a pair of bends 156,156' of the single continuous piece of material defining the side flange portion 154 and generally planar portion 152 of the door hinge assembly 150. The bends 156,156' form a pair of curled hinge barrels 174,174'. In this manner, first hinge elements 158 are provided which overcome the aforementioned disadvantages associated with known multi-component hinge assemblies, such as multi-component telescopic hinge assembly 18 previously discussed with respect to the electrical enclosure 2 of FIG. 1. Specifically, by making the first hinge element(s) 158 from a portion of the same piece of material as the generally planar portion 152 of the door hinge assembly 150, proper alignment of the door hinge assembly 150, including the generally planar portion 152 thereof, is achieved, thereby allowing for complete, substantially moisture-proof coverage of the opening 115 of the enclosure housing 104 by the generally planar portion 152 when the door hinge assembly 150 is disposed in the closed position.

Continuing to refer to FIG. 2, the example door hinge assembly 150 includes as the at least one second hinge element 160, a pair of hinge pins 164 which are coupled to the first opposing sidewall 106 of the enclosure housing 104, in order to pivotably receive the aforementioned curled hinge barrels 174,174'. It will be appreciated that the hinge pins 164 may be coupled to the housing 104 using any known or suitable fastening mechanism such as, for example and without limitation, the plurality of fasteners 166, shown in FIG. 2. The hinge pins 164 and the curled hinge barrels 174,174' pivotably received by the hinge pins 164, in the example of FIG. 2, comprise a pair of telescopic hinge assemblies 176. At least one of the hinge assemblies (e.g., telescopic hinge assemblies 176) preferably further includes a biasing mechanism, such as a spring 162. The spring 162 biases the door hinge assembly 150 in order to maintain the door hinge assembly 150 in the closed position. In the example of FIG. 2, this entails employing a pair of compression springs 162, which are disposed over the hinge pins 164, in order to bias the door hinge assembly 150 in the vertical direction under the moisture-resistant hood 114. It will, however, be appreciated that any known or suitable biasing mechanism such as, for example, the torsional spring 262 which will be described hereinbelow with respect to FIG. 4, could be employed to perform the desired biasing function.

More specifically, each spring 162 includes a first end 168, a second end 170, and a plurality of coils 172 disposed between the first end 168 and the second end 170. The hinge pin 164 engages the coils 172 of the spring 162, and the first end 168 of the spring 162 engages one of: (a) a portion of the hinge pin 164 (shown in FIG. 2), and (b) the sidewall 106 of the housing 104 on which the hinge pin 164 (see, for example, hinge pin 264 engaging sidewall 206 of FIG. 4) is disposed. The second end 170 of the spring 162 engages and biases a portion of the door hinge assembly 150 toward the closed position, as previously discussed. For example, in FIG. 2, each spring 162 engages and biases a corresponding one of the curled hinge barrels 174,174' of the first hinge elements 158 of the door hinge assembly 150. However, when a torsional spring 262 is employed, as shown in the example of FIG. 4, the hinge pin 264 is similarly disposed through the coils 272 of the spring 262, the first end 268 of the spring 262 engages the sidewall 206 of the enclosure housing 204, and the second end 270 of the torsional spring 262 engages and biases the side flange portion 254 of the door hinge assembly 250 in order to pivot (e.g., clockwise from the perspective of FIG. 4) the door hinge assembly 250 towards the closed position.

The door hinge assembly 150 and, in particular, the single continuous piece of material which comprises the first hinge element 158 of the door hinge assembly 150, may be further understood with reference to FIGS. 3A, 3B and 3C which illustrate the generally planar portion 152, side flange portion 154, and first hinge elements 158 thereof. FIG. 3A provides a vertical elevational view of the generally planar portion 152, side flange portion 154, and first hinge elements 158 of the door hinge assembly 150, whereas FIGS. 3B and 3C provide side elevational and bottom plan views of the same components, respectively.

Figure 4:
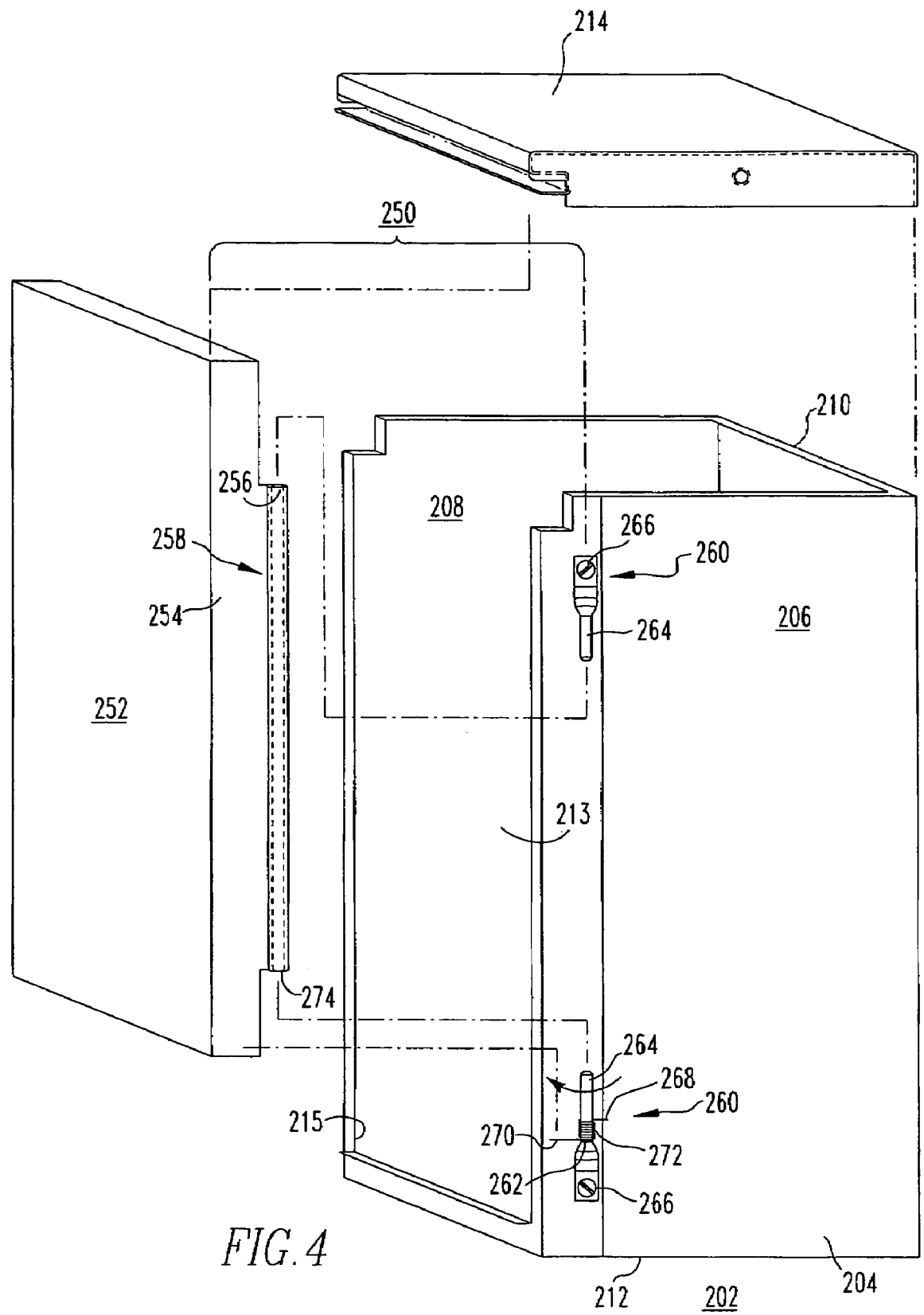
FIG. 4 is an isometric view of an electrical enclosure including a door with a single hinge and a biasing mechanism, in accordance with another embodiment of the invention.

FIG. 4 shows example electrical enclosure 202 wherein the door hinge assembly 250 is not of the telescopic variety, previously discussed. Specifically, similar to the electrical enclosure 102 of FIG. 2, electrical enclosure 202 includes housing 204 with first and second opposing sidewalls 206, 208, a back panel 210, a base 212, and a top 214 (e.g., a moisture-resistant hood 214), thereby defining an interior 213 and an opening 215 for providing access to the interior 213. However, the second hinge elements 260 of the door hinge assembly 250 of FIG. 4 comprise first and second hinge pins 264 which are shorter than the hinge pins 164 of FIG. 2 and, therefore, do not provide the same telescopic function. Additionally, the first hinge element 258 comprises a first single elongated hinge curl 274 which is engaged by both hinge pins 264. The hinge pins 264 are coupled to the first opposing sidewall 206 of the enclosure housing 204 by any known or suitable fastening mechanism, such as the fasteners 266, shown. To assembly the door hinge assembly 250, the lower (from the perspective of FIG. 4) hinge pin 264 is first coupled to first opposing sidewall 206 by fastener 266. The torsional spring 262 (discussed previously), is then inserted over the hinge pin 264 and the lower edge (from the perspective of FIG. 4) of the first single elongated hinge curl 274 is slid over the hinge pin 264. The second or top (from the perspective of FIG. 4) hinge pin 264 is then inserted into the top edge (from the perspective of FIG. 4) of the first single elongated hinge curl 274 and coupled to first opposing sidewall 206 of the enclosure housing 204 by fastener 266. It will, however, be appreciated that any suitable assembly sequence and/or procedure could be employed, and that any known or suitable alternative second hinge element other than the hinge pins 264 shown and described herein, could be employed without departing from the scope of the invention. It will further be appreciated that any suitable number of springs (e.g., torsional spring 262) of any suitable variety could be alternatively employed, and that alternative embodiments of the invention, such as, for example and without limitation, the example shown and described hereinbelow with respect to FIG. 5, do not require any springs to be employed.

Figure 5:
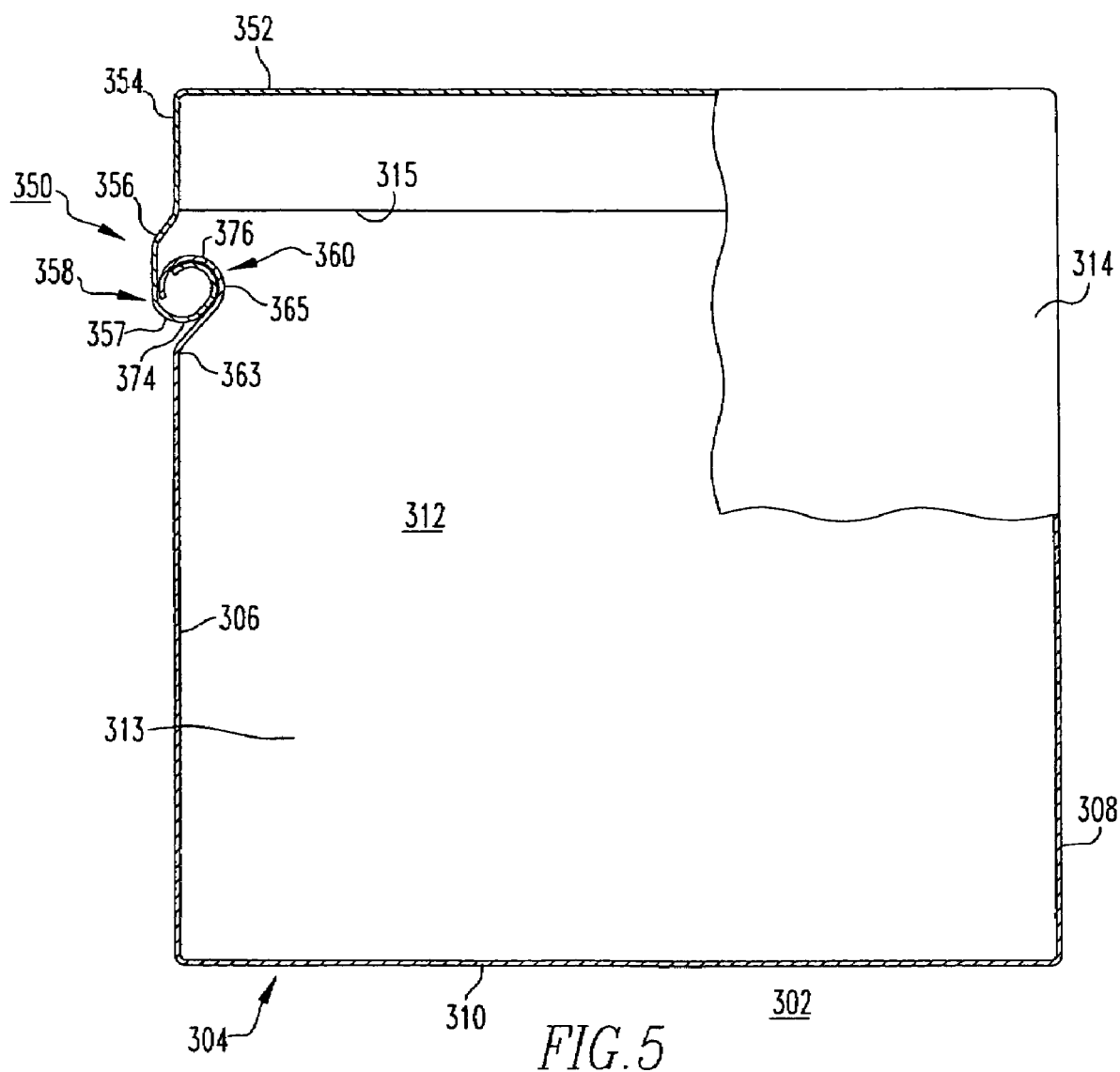
FIG. 5 is top plan partially sectioned view of a portion of an electrical enclosure, and door and hinge assembly therefor, in accordance with another embodiment of the invention.

FIG. 5 shows another example electrical enclosure 302 wherein the door hinge assembly 350 comprises a pair of cooperating first and second hinge curls 374,376. More specifically, the single continuous piece of material comprising the generally planar portion 352, side flange portion 354, and first hinge element 358 of the door hinge assembly 350 includes first and second bends 356,357 to define the first single elongated hinge curl 374, as shown. Another single continuous piece of material comprises both the first opposing sidewall 306 of the housing 304 of the electrical enclosure 302 and the second hinge element 360. Specifically, such single continuous piece of material includes first and second bends 363,365 to define the second hinge curl 376 which cooperates with the first single elongated hinge curl 374, as shown, in order to permit the door hinge assembly 350 to pivot with respect to the housing 304. Although no biasing element is shown, it will be appreciated that any known or suitable type and number of biasing elements could be employed with door hinge assembly 350.

Figure 1:
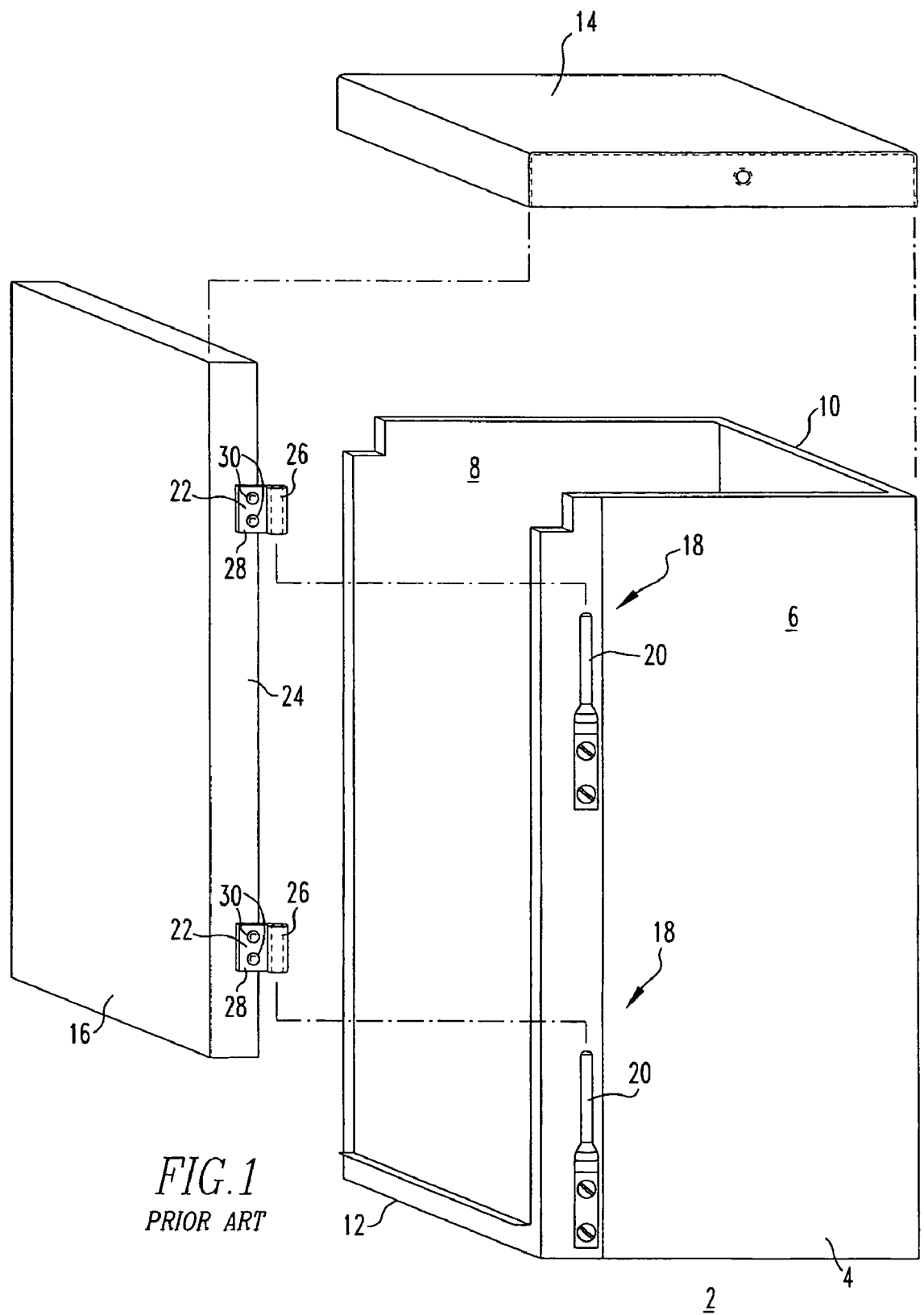
FIG. 1 is an isometric view of an electrical enclosure including telescopic hinges.

Accordingly, the disclosed door hinge assemblies 150,250, 350 overcome the disadvantages of known multi-component hinge assemblies (e.g., without limitation, multi-component telescopic hinge assembly 18 of electrical enclosure 2 of FIG. 1), and in particular, manufacturing defects (e.g., weld defects; improper alignment) associated therewith. The door hinge assemblies 150,250,350 also comprise relatively fewer components, thus requiring less time, equipment, and expertise to assemble. Therefore, the door hinge assemblies 150, 250,350 are also relatively more cost-effective.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to scope of invention which is to be given the full breadth of the claims appended and any and all equivalents thereof.

What is claimed is:

1. A door hinge assembly for an enclosure including a housing having a panel member and a plurality of sides extending outwardly from said panel member to define an interior and an opening for providing access to said interior, said door hinge assembly comprising: a generally planar portion structured to cover said opening of said housing of said enclosure; at least one side flange portion structured to extend outwardly from said generally planar portion toward said housing of said enclosure, at least one of said at least one side flange portion including a number of bends forming at least one first hinge element; and at least one second hinge element structured to be disposed at or about one of said sides of said housing of said enclosure, in order to pivotably receive a corresponding one of said at least one first hinge element, wherein said at least one side flange portion and said at least one first hinge element thereof, are a single continuous piece of material, wherein said door hinge assembly is structured to move between an open position corresponding to said interior of said housing of said enclosure being accessible through said opening of said housing, and a closed position in which said generally planar portion of said door hinge assembly substantially covers said opening of said housing, and wherein said at least one first hinge element comprises a number of hinge curls, wherein said at least one second hinge element comprises a number of hinge pins, and wherein said hinge curls slide over said hinge pins.

2. The door hinge assembly of claim 1 wherein said at least one second hinge element includes at least one biasing mechanism; and wherein said at least one biasing mechanism is structured to bias said door hinge assembly in order to maintain said door hinge assembly in said closed position.

3. The door hinge assembly of claim 1 wherein said bends of said at least one first hinge element comprise a pair of bends of said single continuous piece of material of said at least one of said at least one side flange portion of said generally planar portion; and wherein said pair of bends comprises a pair of curled hinge barrels.

4. The door hinge assembly of claim 3 wherein said at least one second hinge element comprises a pair of hinge pins structured to be coupled to said one of said sides of said housing in order to pivotably receive said curled hinge barrels.

5. The door hinge assembly of claim 4 wherein said sides of said housing of said enclosure comprise first and second opposing side walls, a base, and a moisture-resistant hood; wherein said hinge pins and said hinge barrels pivotably received by said hinge pins comprise a pair of telescopic hinge assemblies for said door hinge assembly; and wherein at least one of said telescopic hinge assemblies further comprises a spring structured to bias said door hinge assembly in the vertical direction, under said moisture-resistant hood.

6. The door hinge assembly of claim 1 wherein said at least one first hinge element comprises a first single elongated hinge curl.

7. The door hinge assembly of claim 6 wherein said at least one second hinge element comprises a second hinge curl cooperable with said first single elongated hinge curl in order to permit said door hinge assembly to pivot with respect to said housing of said enclosure.

8. The door hinge assembly of claim 7 wherein said at least one second hinge curl and said one of said sides of said housing of said enclosure are one single continuous piece of material.

9. The door hinge assembly of claim 1 wherein said single continuous piece of material is metal.

10. A door hinge assembly for an enclosure including a housing having a panel member and a plurality of sides extending outwardly from said panel member to define an interior and an opening for providing access to said interior, said door hinge assembly comprising:

a generally planar portion structured to cover said opening of said housing of said enclosure;

at least one side flange portion structured to extend outwardly from said generally planar portion toward said housing of said enclosure, at least one of said at least one side flange portion including a number of bends forming at least one first hinge element; and at least one second hinge element structured to be disposed at or about one of said sides of said housing of said enclosure, in order to pivotably receive a corresponding one of said at least one first hinge element, wherein said at least one of said at least one side flange portion, including said at least one first hinge element thereof, is a single continuous piece of material, wherein said door hinge assembly is structured to move between an open position corresponding to said interior of said housing of said enclosure being accessible through said opening of said housing, and a closed position in which said generally planar portion of said door hinge assembly substantially covers said opening of said housing, wherein said at least one second hinge element includes at least one biasing mechanism, wherein said at least one biasing mechanism is structured to bias said door hinge assembly in order to maintain said door hinge assembly in said closed position, and wherein said at least one second hinge element comprises at least one hinge pin structured to be coupled to said one of said sides of said housing; wherein said at least one biasing mechanism comprises at least one spring including a first end, a second end, and a plurality of coils disposed between the first end and the second end; wherein said at least one hinge pin engages said coils of said at least one spring; wherein the first end of said at least one spring engages one of: (a) a portion of said at least one hinge pin, and (b) said one of said sides of said housing on which said at least one hinge pin is disposed; and wherein the second end of said at least one spring engages and biases a portion of said door hinge assembly toward said closed position.

11. The door hinge assembly of claim 10 wherein said spring is selected from the group consisting of a torsion spring and a compression spring.

12. An enclosure comprising:
a housing including a panel member and a plurality of sides extending outwardly from said panel member to define an interior and an opening for providing access to said interior; and a door hinge assembly comprising: a generally planar portion structured to cover said opening of said housing of said enclosure, at least one side flange portion extending outwardly from said generally planar portion toward said housing, at least one of said at least one side flange portion including a number of bends forming at least one first hinge element, and at least one second hinge element disposed at or about one of said sides of said housing in order to pivotably receive a corresponding one of said at least one first hinge element, wherein said at least one side flange portion and said at least one first hinge element thereof, are a single continuous piece of material, wherein said door hinge assembly is movable between an open position corresponding to said interior of said housing of said enclosure being accessible through said opening of said housing, and a closed position in which said generally planar portion of said door hinge assembly substantially covers said opening of said housing, and wherein said at least one first hinge element comprises a number of hinge curls, wherein said at least one second hinge element comprises a number of hinge pins, and wherein said hinge curls slide over said hinge pins.

13. The enclosure of claim 12 wherein said at least one second hinge element includes at least one biasing mechanism; and wherein said at least one biasing mechanism biases said door hinge assembly in order to maintain said door hinge assembly in said closed position.

14. The enclosure of claim 12 wherein said at least one first hinge element comprises a first single elongated hinge curl.

15. The enclosure of claim 14 wherein said at least one second hinge element comprises a second hinge curl; and wherein said second hinge curl cooperates with said first single elongated hinge curl in order to permit said door hinge assembly to pivot with respect to said housing of said enclosure.

16. The enclosure of claim 15 wherein said at least one second hinge curl and said one of said sides of said housing of said enclosure are one single continuous piece of material.

17. The enclosure of claim 12 wherein said enclosure is an electrical enclosure; wherein said panel member of said housing of said electrical enclosure comprises a back panel; wherein said sides of said housing of said electrical enclosure comprise first and second opposing sidewalls extending outwardly from said back panel, a base, and a top disposed generally opposite and distal from said base; and wherein said door hinge assembly is pivotably coupled to one of said first and second opposing sidewalls of said housing of said electrical enclosure.

18. The enclosure of claim 12 wherein said single continuous piece of material of said door hinge assembly is metal.

19. An enclosure comprising:
a housing including a panel member and a plurality of sides extending outwardly from said panel member to define an interior and an opening for providing access to said interior; and
a door hinge assembly comprising:
a generally planar portion structured to cover said opening of said housing of said enclosure,
at least one side flange portion extending outwardly from said generally planar portion toward said housing, at least one of said at least one side flange portion including a number of bends forming at least one first hinge element, and
at least one second hinge element disposed at or about one of said sides of said housing in order to pivotably receive a corresponding one of said at least one first hinge element,
wherein said at least one of said at least one side flange portion, including said at least one first hinge element thereof, is a single continuous piece of material,
wherein said door hinge assembly is movable between an open position corresponding to said interior of said housing of said enclosure being accessible through said opening of said housing, and a closed position in which said generally planar portion of said door hinge assembly substantially covers said opening of said housing,
wherein said at least one second hinge element includes at least one biasing mechanism,
wherein said at least one biasing mechanism biases said door hinge assembly in order to maintain said door hinge assembly in said closed position, and
wherein said at least one second hinge element comprises at least one hinge pin coupled to said one of said sides of said housing of said enclosure; wherein said at least one biasing mechanism comprises at least one spring including a first end, a second end, and a plurality of coils disposed between the first end and the second end; wherein said at least one hinge pin engages said coils of said at least one spring; wherein the first end of said at least one spring engages one of: (a) a portion of said at least one hinge pin, and (b) said one of said sides of said housing of said enclosure on which said at least one hinge pin is disposed; and wherein the second end of said at least one spring engages and biases a portion of said door hinge assembly toward said closed position.

20. An enclosure comprising:
a housing including a panel member and a plurality of sides extending outwardly from said panel member to define an interior and an opening for providing access to said interior; and
a door hinge assembly comprising:
a generally planar portion structured to cover said opening of said housing of said enclosure,
at least one side flange portion extending outwardly from said generally planar portion toward said housing, at least one of said at least one side flange portion including a number of bends forming at least one first hinge element, and
at least one second hinge element disposed at or about one of said sides of said housing in order to pivotably receive a corresponding one of said at least one first hinge element,
wherein said at least one of said at least one side flange portion, including said at least one first hinge element thereof, is a single continuous piece of material,
wherein said door hinge assembly is movable between an open position corresponding to said interior of said housing of said enclosure being accessible through said opening of said housing, and a closed position in which said generally planar portion of said door hinge assembly substantially covers said opening of said housing, and
wherein said bends of said at least one first hinge element comprise a pair of bends of said single continuous piece of material of said at least one of said at least one side flange portion of said generally planar portion of said door hinge assembly; and wherein said pair of bends comprises a pair of curled hinge barrels.

21. The enclosure of claim 20 wherein said at least one second hinge element comprises a pair of hinge pins coupled to said one of said sides of said housing of said enclosure, in order to pivotably receive said curled hinge barrels.

22. The enclosure of claim 21 wherein said sides of said housing of said enclosure comprise first and second opposing sidewalls, a base, and a moisture-resistant hood; wherein said hinge pins and said hinge barrels pivotably received by said hinge pins comprise a pair of telescopic hinge assemblies for said door hinge assembly; and wherein at least one of said telescopic hinge assemblies further comprises a spring for biasing said door hinge assembly in the vertical direction under said moisture-resistant hood.

* * * * *

UNITED STATES PATENT AND TRADEMARK OFFICE
CERTIFICATE OF CORRECTION

PATENT NO. : 7,521,632 B2
APPLICATION NO. : 11/468973
DATED : April 21, 2009
INVENTOR(S) : Jeffrey L. Johnson It is certified that error appears in the above-identified patent and that said Letters Patent is hereby corrected as shown below:

Title Page, Column 1, Item (73) Assignee, "Gaton" should read --Eaton--.

Signed and Sealed this
First Day of October, 2013

Teresa Stanek Rea
*Deputy Director of the United States Patent and Trademark Office*